(12) United States Patent
Albinger et al.

(10) Patent No.: US 10,028,431 B2
(45) Date of Patent: *Jul. 24, 2018

(54) ELECTRICAL SYSTEM FOR RIDING LAWN CARE VEHICLE

(71) Applicant: HUSQVARNA AB, Huskvarna (SE)

(72) Inventors: Matthew Albinger, Shelby, NC (US); Bernard Drew, Savannah, GA (US)

(73) Assignee: HUSQVARNA AB, Huskvarna (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/370,139

(22) Filed: Dec. 6, 2016

(65) Prior Publication Data

US 2017/0099767 A1   Apr. 13, 2017

Related U.S. Application Data

(63) Continuation of application No. 15/009,893, filed on Jan. 29, 2016, now Pat. No. 9,549,500, which is a
(Continued)

(51) Int. Cl.
*A01D 34/00* (2006.01)
*A01D 69/02* (2006.01)
(Continued)

(52) U.S. Cl.
CPC .......... *A01D 34/008* (2013.01); *A01D 34/78* (2013.01); *A01D 69/02* (2013.01); *A01D 34/005* (2013.01); *A01D 34/74* (2013.01); *A01D 2101/00* (2013.01)

(58) Field of Classification Search
CPC ...... A01D 34/001; A01D 34/00; A01D 34/78; A01D 34/006; A01D 34/008;
(Continued)

(56) References Cited

U.S. PATENT DOCUMENTS

| 3,144,723 A | 8/1964 | Carter |
| 4,178,741 A | 12/1979 | Lonn et al. |
| (Continued) | | |

FOREIGN PATENT DOCUMENTS

| CN | 1695419 A | 11/2005 |
| CN | 1828459 A | 9/2006 |
| (Continued) | | |

OTHER PUBLICATIONS

International Search Report and Written Opinion in the international patent application No. PCT/US2012/071979 dated Mar. 8, 2013.
International Preliminary Report on Patentability in international patent application No. PCT/US2012/071979 dated Jul. 1, 2014.

*Primary Examiner* — Robert E Pezzuto
(74) *Attorney, Agent, or Firm* — McNair Law Firm, P.A.

(57) ABSTRACT

A riding lawn mower is provided with an electrical system. The electrical system includes a control module, transceiver modules, and a wiring system. The control module allows for programmably controlling electrical operations of the riding lawn mower. The transceiver modules are operably connected with respective devices of the riding lawn mower so as to communicate data between the respective devices and the control module. The wiring system includes wires that electrically connect the transceiver modules with the control module. The wiring system includes a power wire that provides electrical power to the transceiver modules from the battery; and a data bus including a data wire that transmits data between the control module and the transceiver modules.

20 Claims, 8 Drawing Sheets

Related U.S. Application Data continuation of application No. 14/369,066, filed as application No. PCT/US2012/071979 on Dec. 28, 2012, now Pat. No. 9,265,196.

(60) Provisional application No. 61/580,943, filed on Dec. 28, 2011.

(51) Int. Cl.
*A01D 34/78* (2006.01)
*A01D 34/74* (2006.01)
*A01D 101/00* (2006.01)

(58) Field of Classification Search
CPC .. A01D 41/127; A01D 41/1271; A01D 69/02; A01D 34/64; A01D 34/66; A01D 2101/00; A01D 34/74; A01D 34/005; A01F 15/0816; B60L 1/003; B60L 15/00; B60L 15/025; B60L 3/0061
USPC .... 56/10.2 A, 10.2 R, 10.5, 11.9, 10.6, 11.7; 180/6.48, 65.31; 701/22–25, 41, 50
See application file for complete search history.

(56) References Cited

U.S. PATENT DOCUMENTS

| | | |
|---|---|---|
| 4,500,970 A | 2/1985 | Daemmer |
| 4,760,275 A | 7/1988 | Sato et al. |
| 4,777,785 A | 10/1988 | Rafaels |
| 5,351,778 A | 10/1994 | Shigemi et al. |
| 5,719,551 A | 2/1998 | Flick |
| 6,151,298 A | 11/2000 | Bernhardsson et al. |
| 7,242,109 B2 | 7/2007 | Beeren |
| 7,367,173 B2 | 5/2008 | Daly et al. |
| 7,665,283 B2 | 2/2010 | Turner et al. |
| 7,957,850 B2 | 6/2011 | Anderson |
| 2006/0244309 A1 | 11/2006 | Claussen et al. |
| 2007/0042803 A1 | 2/2007 | Anderson |
| 2009/0201650 A1 | 8/2009 | Hauser et al. |
| 2011/0234153 A1 | 9/2011 | Abramson |

FOREIGN PATENT DOCUMENTS

| | | |
|---|---|---|
| EP | 910105 A2 | 4/1999 |
| EP | 1069733 A2 | 1/2001 |
| WO | 2010077198 A1 | 7/2010 |

ELECTRICAL SYSTEM FOR RIDING LAWN CARE VEHICLE

CROSS REFERENCE TO RELATED APPLICATIONS

The present application is a continuation of U.S. application Ser. No. 15/009,893 filed Jan. 29, 2016, which is a continuation of application Ser. No. 14/369,066 filed Jun. 26, 2014 (now U.S. Pat. No. 9,265,196, which issued on Feb. 23, 2016), which is a national phase entry of PCT/US2012/071979 filed Dec. 28, 2012, which claims priority to U.S. 61/580,943 filed Dec. 28, 2011, all of which are expressly incorporated by reference in their entirety.

BACKGROUND

Outdoor tasks, such as grooming and maintaining property, are commonly performed using outdoor power equipment, such as a riding lawn care mower. Such equipment uses relatively complex electrical and wiring systems to route functionality and power through complicated components. For example, lawn mowers typically have their electrical switches and circuits routed through the ignition switch in a complicated way that must be custom designed for each riding lawn mower model. The components of these systems are contingent on other components of the system. As such, current electrical and current wiring systems limit the flexibility of easily adding or removing components or features. For example, if a switch needs to be added to or removed from a current wiring system, such wiring system may have to be completely redesigned to include the switch because adding or removing the switch may require a new wiring harness, require modification of the complex routing of the wiring harness through the vehicle, and interfere with the functionality of the system due to the interdependency and inter-relationships of components. Furthermore, conventional wiring harnesses for riding lawn care vehicles become very expensive, complex, and difficult to route through the vehicle when one considers adding a lot of electrical functionality to the conventional wiring harness.

Moreover, current systems have limited capabilities in that these systems are not functionally programmable or re-programmable. If a system is programmed for certain functions, but different operations are desired, a completely new electrical system must be designed, thereby resulting in a relatively inflexible system. Redesigning such system would be expensive, cumbersome and inefficient.

Additionally, switches in existing wiring systems mostly remain as an open circuit until its function is realized, which then will close the circuit. However, if such switch becomes inoperable, the switch will likely emulate an open circuit. Such open circuit state may also be the normal standby state of the switch. As such, existing systems may not know whether a switch needs to be replaced/repaired or is just in a normal standby state.

Additionally, current wiring systems do not have data collection/communication capabilities, and thus, current systems do not know the working status of components of the electrical system or parts of the riding lawn mower.

BRIEF SUMMARY OF SOME EXAMPLES

In order to provide a more modular, flexible, and efficient wiring system for riding lawn care vehicles, a wiring harness system is provided that consolidates switches and wiring into a single system suitable for a riding lawn care vehicle. The wiring harness system of the present disclosure connects switches in parallel with a primary control module so that the switches and other features can easily be removed or added to the riding lawn care vehicle depending on the model. Additionally, smart technology is implemented in the wiring harness to be able to communicate with the switches to determine the current state of the lawn care vehicle's switches. Other features and components are also included in the lawn care vehicle's electrical system, according to some embodiments, such as a display, Bluetooth connectivity between the primary control module and another device (e.g., a smart phone), and the like. This system has added benefits of providing a wiring harness for a riding lawn care vehicle that has a flexible, modular design that makes it easier to engineer and manufacture a variety of different models of riding lawn care vehicle.

In one example embodiment, a riding lawn care vehicle includes a frame, a cutting deck operably attached to an underside portion of the frame, an operator seat operably attached to the frame, rear and front wheels operably attached to the frame, steering controls for directing at lease one of the wheels; a battery, an axle configured to turn at least one wheel, an engine configured to rotate the axle, a control module, transceiver modules and a wiring system. The control module is configured for programmably controlling electrical operations of the riding lawn mower, a plurality of transceiver modules separate from the control module, the transceiver modules being operably connected with respective devices of the riding lawn mower so as to communicate data between the respective devices and the control module, The wiring system includes wires that electrically connect the transceiver modules with the control module. The wiring system includes a power wire that provide electrical power to the transceiver modules from the battery, and a data bus. The data bus includes a data wire that transmits data between the control module and the transceiver modules. The data wire is configured to be attached to the frame of the riding lawn mower. The transceiver modules are connected to the power wire in parallel and are also connected to the data bus in parallel.

In another example embodiment, a riding lawn care vehicle includes a frame, a cutting deck operably attached to an underside portion of the frame, an operator seat operably attached to the frame, wheels operably attached to the frame, steering controls for directing at lease one of the wheels, a control module for controlling electrical operations of the riding lawn care vehicle, and at least one transceiver module. The transceiver module is operably connected with a device of the riding lawn care vehicle so as to communicate data to and from the device to the control module. The transceiver module includes memory containing a transceiver identifier, a transceiver, and a processor. The transceiver is configured to receive a request from the control module, whereby the request includes a request identifier and an instruction. The processor is configured to receive the request identifier from the transceiver; retrieve, from the memory, the transceiver identifier of the transceiver module; compare the request identifier of the request with the transceiver identifier of the transceiver module to determine if the identifiers match; and in response to a successful match, perform the instructions.

In another example embodiment, a riding lawn care vehicle comprises a frame, a cutting deck operably attached to an underside portion of the frame, wheels operably attached to the frame, steering controls for directing at lease one of the wheels, a wiring system, a control module controlling electrical operations of the riding lawn care vehicle, a first transceiver module, and a second transceiver module. The first transceiver module being attached to a first device of the riding lawn care vehicle and including a first transceiver to communicate with the control module. The second transceiver module includes a second transceiver to communicate with the control module. Additionally, the second transceiver is attached to a second device of the riding lawn care vehicle, The first and second transceiver modules are connected with the control module via the wiring system. The control module is programmed to send instructions to the transceiver modules and to perform operations based on a response to the instructions.

Some example embodiments may improve the flexibility of the design of the electrical system as well as a programmable control module that can request status information of various parts of the electrical system. The overall new design improves effectiveness of electrical designs of riding lawn mowers.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1A:
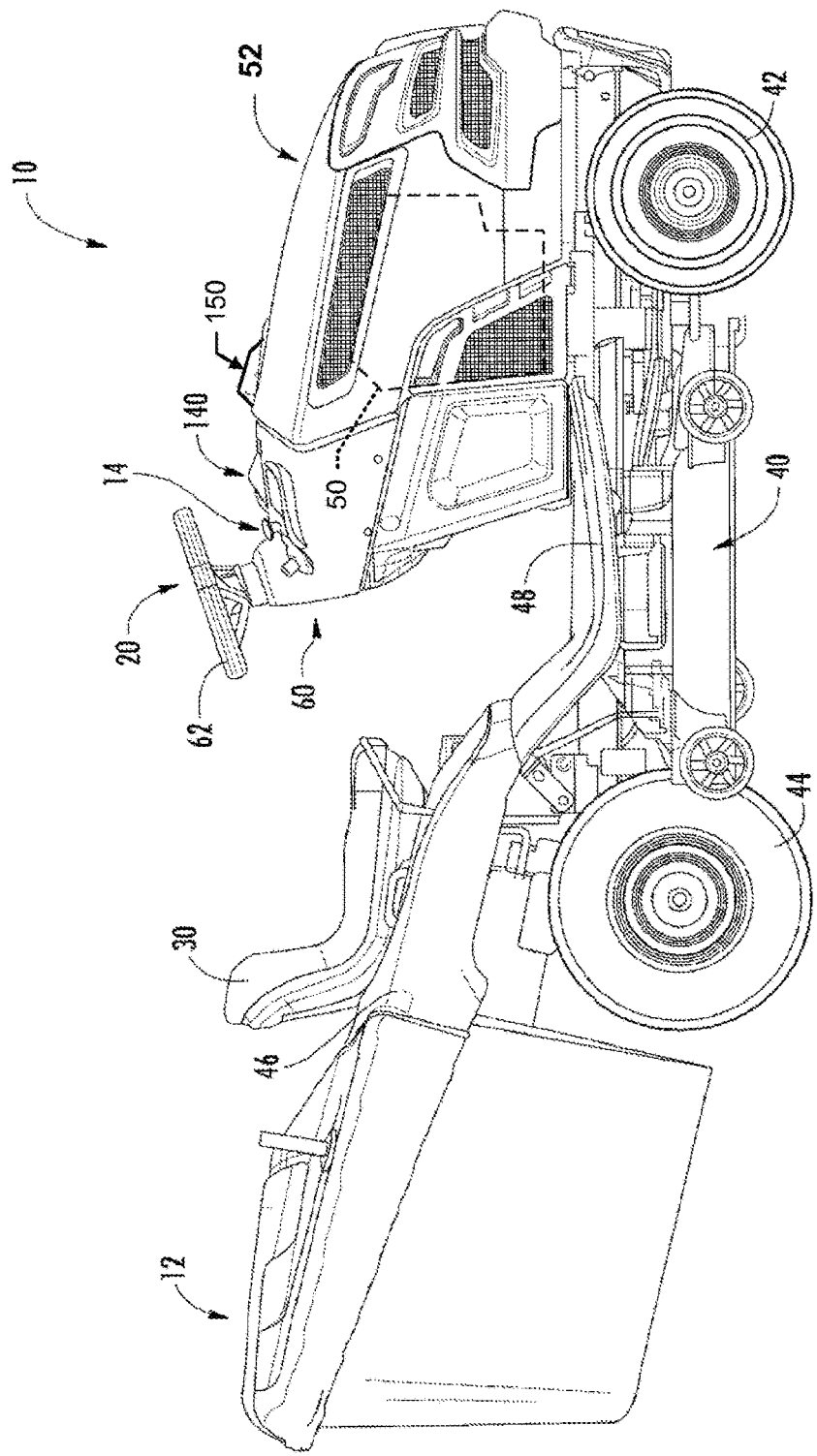
FIG. 1A illustrates a side view of a riding lawn care vehicle according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "lawn care" is meant to relate to any yard maintenance activity and need not specifically apply to activities directly tied to grass, turf or sod care. As used herein, operable coupling should be understood to relate to direct or indirect connection that, in either case, enables functional interconnection of components that are operably coupled to each other.

In an example embodiment, a riding lawn care vehicle, such as a riding lawn mower, includes a wiring system having a control module, a series of transceiver modules, common powering wires, and a common data bus. The transceiver modules are connected in parallel with the common powering wires and the common data bus. This allows switches and other electrical devices to be easily removed or added to the wiring harness system without redesigning the wiring harness system. Additionally, the wiring harness system may allow for data collection between the electrical devices and a primary control module so that the primary control module knows which electrical devices are in working order and other information about the components on the wiring harness system. More detail about these and other embodiments of the wiring harness system is disclosed below.

While discussing various embodiments below, it should be understood that the present disclosure may be applicable to any outdoor power equipment other than a riding lawn care vehicle. However, for ease of illustration and description, the figures and the related description of the present disclosure is described with respect to a riding lawn care vehicle according to some embodiments.

Figure 1B:
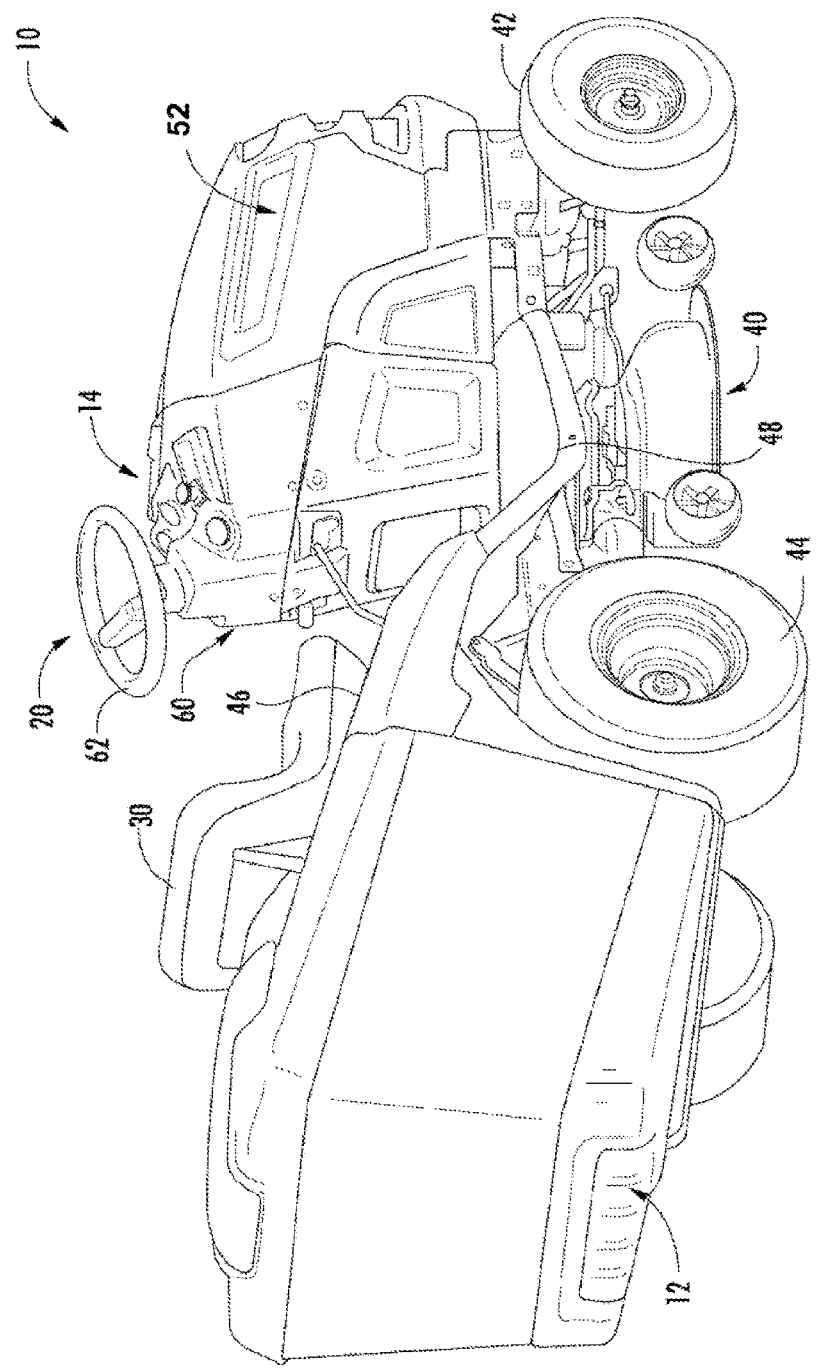
FIG. 1B illustrates a perspective view of the riding lawn care vehicle according to an example embodiment.

FIG. 1, which includes FIGS. 1A and 1B, illustrates an example of a riding lawn care vehicle 10. The riding lawn care vehicle 10 may include an information panel 14 displaying operational information regarding the riding lawn care vehicle 10. As shown and described herein, the riding lawn care vehicle 10 may be a riding lawn mower (e.g., a lawn tractor, front-mount riding lawn mower, zero-turn riding lawn mower, and/or the like). However, other example embodiments may be employed on riding lawn care vehicles that are configured or otherwise equipped to handle snow removal, brush cutting, tilling or other lawn care-related activities.

FIG. 1A illustrates a side view of the riding lawn care vehicle 10 and FIG. 1B illustrates a perspective view of the riding lawn care vehicle 10. The riding lawn care vehicle 10 may include a steering assembly 20 (e.g., including a steering wheel, handle bars, or other steering apparatus) functionally connected to wheels of the riding lawn care vehicle 10 to which steering inputs are provided (e.g., the front and/or rear wheels in various different embodiments) to allow the operator to steer the riding lawn care vehicle 10. In some embodiments, the riding lawn care vehicle 10 may include a seat 30 that may be disposed at a center, rear or front portion of the riding lawn care vehicle 10. The operator may sit on the seat 30, which may be disposed to the rear of the steering assembly 20 to provide input for steering of the riding lawn care vehicle 10 via the steering assembly 20. A sensor may be included that detects whether or not an operator is currently sitting in the seat 30.

The riding lawn care vehicle 10 may also include, or be configured to support attachment of, a cutting deck 40 having at least one cutting blade mounted therein. In some cases, a height of the at least one cutting blade may be adjustable by an operator of the riding lawn care vehicle 10. The cutting deck 40 may be a fixed or removable attachment in various different embodiments. Moreover, a location of the cutting deck 40 may vary in various alternative embodiments. For example, in some cases the cutting deck 40 may be positioned in front of the front wheels 42, behind the rear wheels 44, or in between the front and rear wheels 42 and 44 (as shown in FIG. 1) to enable the operator to cut grass using the at least one cutting blade when the at least one cutting blade is rotated below the cutting deck 40. In some embodiments, the front wheels 42 and/or the rear wheels 44 may have a shielding device positioned proximate thereto in order to prevent material picked up in the wheels from being ejected toward the operator. When operating to cut grass, the grass clippings may be captured by a collection system (e.g., bagging attachment 12), mulched, or expelled from the cutting deck 40 via either a side discharge or a rear discharge.

The riding lawn care vehicle 10 may also include additional control related components such as one or more speed controllers, cutting height adjusters and/or the like. Some of the controllers, such as the speed controllers, may be provided in the form of foot pedals that may sit proximate to a footrest 48 (which may include a portion on both sides of the riding lawn care vehicle 10) to enable the operator to rest his or her feet thereon while seated in the seat 30.

In the pictured example embodiment of FIG. 1A, an engine 50 of the riding lawn care vehicle 10 is disposed substantially forward of a seated operator. However, in other example embodiments, the engine 50 could be in different positions such as below or behind the operator. In some embodiments, the engine 50 may be operably coupled to one or more of the wheels of the riding lawn care vehicle 10 in order to provide drive power for the riding lawn care vehicle 10. In some embodiments, the engine 50 may be capable of powering two wheels, while in others, the engine 50 may power all four wheels of the riding lawn care vehicle 10. Moreover, in some cases, the engine 50 may manually or automatically shift between powering either two wheels or all four wheels of the riding lawn care vehicle 10.

The engine 50 may include an internal combustion engine and/or one or more electric motors. In embodiments where the engine includes an internal combustion engine, the riding lawn care vehicle may include an alternator and a charging unit for charging a battery 206.

The engine 50 may be housed or covered by a hood 52 that forms an engine compartment to protect engine 50 components and improve the aesthetic appeal of the riding lawn care vehicle 10. In an example embodiment, the engine compartment may be positioned proximate to and/or mate with portions of a steering assembly housing 60. The steering assembly housing 60 may house components of the steering assembly 20 to protect such components and improve the aesthetic appeal of the riding lawn care vehicle 10. In some embodiments, a steering wheel 62 of the steering assembly 20 may extend from the steering assembly housing 60 and a steering column (not shown) may extend from the steering wheel 62 down through the steering assembly housing 60 to components that translate inputs at the steering wheel 62 to the wheels to which steering inputs are provided.

In some embodiments, the steering assembly housing 60, the steering wheel 62 and/or the fender 46 may include gauges, displays and/or other user interface components. As such, for example, user interface components may be provided to indicate or display information or notifications to the operator regarding operational parameters related to the operation of the riding lawn care vehicle 10, parameters related to predefined alerts or events, or any other trigger or condition where the operator should be alerted. For example, the information may relate to any of various aspects including parameters related to cutting deck operation, engine operation, run time, work time, etc.

As mentioned above, the engine 50 is housed or covered with a hood 52. The hood 52 may be disposed forwardly of the information panel 14. The hood 52 has a housing that may include a right side wall 54 and a left side wall 53, a front wall 55 and an upper wall 56 formed integral with one another. In one embodiment, the integrated hood 52 may be pivotally connected to a chassis frame to be vertically swingable, to be opened and closed, about a pivotal axis located in a lower front position 57 of the hood 52. In another embodiment, the hood 52 may be moveably mounted to the chassis by any other means, such as via a device that allows the hood 52 to slide horizontally or vertically relative to the chassis. Further, in one embodiment, the hood 52 could be removably mounted to the chassis so that the hood 52 is completely removable from the riding lawn care vehicle 10.

The hood 52 may include a hood handle 150 that may be used to lift the hood 52, either pivotally, slidably or removably. The hood handle 150 is disposed forward of the steering wheel, and lifting up on the hood handle 150 forces the hood 52 to pivot about pivot point 57 lifting the hood 52 away from the engine 50 so that the engine 50 is accessible to an operator standing adjacent to the riding lawn care vehicle 10. The direction of rotation of opening the hood 52, as illustrated, is away from the operator when the operator is seated in the seat 30, according to one embodiment.

As mentioned above, the riding lawn care vehicle 10 includes a frame or chassis. A wiring system (shown schematically in FIG. 2) may be attached to the frame or chassis of the riding lawn care vehicle 10. As will be discussed in more depth below, the wiring system is a component of an overall electrical system of the riding lawn care vehicle 10 to allow for electrical/data communications between components, powering and operation of components, and other operations of the riding lawn care vehicle 10 to be performed. The wiring system includes a wiring harness which includes a series of wires or cables that transmit information signals or operating currents. The wiring harness connects various components in the overall wiring system, including a primary control module, a series of switches, and various components of the riding lawn care vehicle 10.

Figure 2:
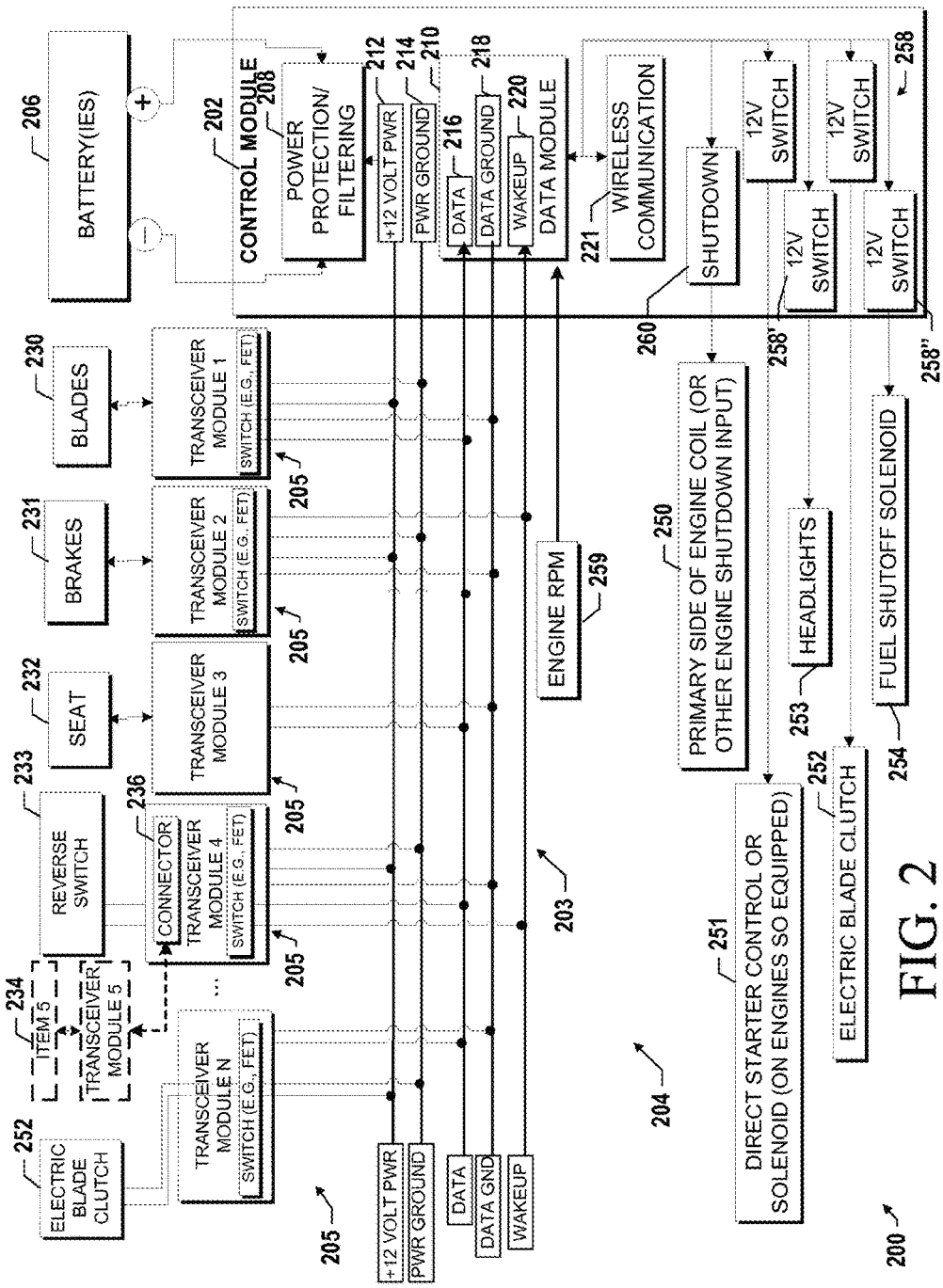
FIG. 2 illustrates a block schematic diagram of an electrical system of a riding lawn care vehicle according to example embodiments.

In an example embodiment of FIG. 2, an exemplary electrical system 200 is shown having a control module 202, a wiring system 204, a plurality of transceiver modules 205, one or more batteries 206 as well as various devices 230-234 (e.g., headlights, seat, blades, etc.) of the riding lawn care vehicle 10. The components of the electrical system 200 are electronically connected to each other using the wiring system 204, according to some embodiments. In one embodiment, the wiring system 204 includes a series of wires that electrically connects the control module 202 with each of the transceiver modules 205 and optionally other devices. Each of these components of the electrical system 200 (e.g., the control module 202, the wiring system 204, the transceiver modules 205, and battery(ies) 206) is discussed in more depth below.

The battery 206 is mounted to the riding lawn mower 10 to provide power to components of the riding lawn care vehicle 10. For example, the battery 206 provides power to the engine when the starter is activated so as to crank the engine. Additionally, the battery 206 supplies power to the control module 202, which in turn, supplies power to the transceiver modules 205. The battery 206 may be one battery or multiple batteries. If the riding lawn care vehicle 10 employs multiple batteries, these batteries may be connected together in series so that the voltage and current is added together to boost the total possible power output. In another embodiment, the batteries 206 may provide power separately to the control module 202 by placing one battery is placed in parallel with another battery so that if one battery failed, the backup battery would take over. The output of the battery 206 is applied to a power protection/filtering module 208 of the control module 202.

The wiring system 204 includes a series of wires 203, such as a data wire 216 and a data ground 218 (collectively "data bus"), a voltage wire 212 and a power ground 214 (collectively "power wires"), and/or a wakeup wire 218. According to one embodiment, the data bus is the medium by which data signals are communicated between the transceiver modules 205 and the control module 202 as illustrated in FIG. 2. As such, the data bus allows two-way communications between the transceiver modules 205 and the data module 210 on the control module 202. The power wires allow for powering of each of the transceiver modules 205 connected to the power wires as well as the riding lawn mower devices associated with the transceiver modules 205.

In one embodiment, some transceiver modules may only require low voltage and in such case, both communicate data and receive power over the same pair of data bus wires. In this regard, these transceiver modules would not be connected to the power wires and thus, may only be connected to the data bus wires. Thus, in some embodiments, the data wires act as both powering wires and data communication wires for the transceiver modules. However, it should be understood that the wiring harness system also includes the power wires (e.g., 12-Volt power wire and a power ground wire) to power transceiver modules or other electrical devices that require power that is too high to send over the data bus, even though some (or all) transceiver modules may not be connected to the power wires.

As shown in the illustrative embodiment of FIG. 2, each of the transceiver modules 205 are connected in parallel to the data bus and the power wires (and each transceiver module may include a connector that make it easy to extend the wiring harness system by plugging in another transceiver module or wiring extension into the pigtail connector, as discussed later). This allows for a flexible design of the electrical system 200 in that any of the transceiver modules 205 can be easily removed or added to the wiring system 204 without affecting the other components on the system, such as the transceiver modules 205, riding lawn mower devices, etc. For example, if a user would like to remove transceiver module 1 from the electrical system 200 of FIG. 2, the user simply disconnects transceiver module 1 from the data bus and the power wires. After such disconnection, the other transceiver modules 205 will still be operatively connected with the electrical system 200 without changing the amount of power received or the data communication ability of the still-connected transceiver modules 205. This is true because these transceiver modules 205 are each operatively connected in parallel to the data bus and power wires. Additionally, if a transceiver module, such as transceiver module 5, is desired to be added to the electrical system, the user can attach the transceiver module 5 in parallel to the data bus and the power wires (or to a connector on another transceiver module as will be discussed later). At this point, the transceiver module 5 is then connected with the control module 202 without having to redesign the electrical system to accommodate this new transceiver module.

As mentioned above, the wiring system 204 may also include a wakeup wire 220. The wakeup wire 220 allows a DC voltage signal to be applied to the wire in response to a predetermined condition to indicate a "wake up" event to the control module 202. For example, in one embodiment, if transceiver module 3 (which is associated with the operator seat 232) is connected with the wakeup wire 220 (not shown in FIG. 2) and if the operator has just sat in the operator seat 232, the transceiver module 3 associated with the operator seat 232 sends a wakeup signal (e.g., a 12 Volt DC signal) along the wakeup wire 220 to the data module 210 of the control module 202 to indicate that an operator is now present. In response to receipt of such a wakeup signal, the control module 202 performs one or more actions in response thereto, such as to activate the display, perform diagnostics, perform startup procedures, or any other actions which may be associated with determining that the operator is present with the riding lawn care vehicle 10. The wakeup signal could be a 12 volt DC signal sent to the control module 202 and could be grounded or zero volts while in an idle status stage or if there has been no predetermined wakeup condition or event. Handling of receipt of the wakeup signal is discussed later with regard to the discussion of the control module 202. It should be understood that the wakeup wire 220 is optional in that the wakeup signal could be transmitted along the data bus instead of the wakeup wire 220. It should also be noted that not all (if any) transceiver modules 205 are connected with the wakeup wire 220. For example, in FIG. 2, only transceiver modules 2 and 4 are illustrated as connected to the wakeup wire 220. Additionally, the wakeup wire 220 may be paired with a grounding wire which could be the data ground wire 218 or could be an additional wire.

The wires (e.g., data bus, power wires, and/or wakeup wires) are attached with the control module 202 and may be connected to any other section of the riding lawn care vehicle 10. For example, the data bus wires may be routed from the control module 202 located proximate to the engine through the frame to the seat, cutting deck, brakes, instrument panel, and to the bag deflector. As such the wiring system 204 may be routed to multiple locations along the chassis of the riding lawn care vehicle 10. The wires 203 of the wiring system 204 are attached to the chassis via any means. As will be discussed below, the transceiver modules 205 are attached to the wires 203 of the wiring system 204. However, it should be noted that the wires 203 of the wiring system 204 may include connectors, such as connector 236, to allow for a transceiver module 205 to be attached to the wiring system 204. For example, if a user desires to add a transceiver module 205 for the trimmings bag which will sense when the bag is full, the user may attach the transceiver module 205 to a connector on the wiring system which allows for connection to the data bus and/or power wires. At this point, the added transceiver module 205 is a part of the electrical system of the riding lawn care vehicle 10 and is operably communicative with the control module 202.

It should be understood that the transceiver modules 205 can be connected to any portion of the wiring system 204. In this regard, a transceiver module may be connected to only the power wires but not the data bus or vice versa. Thus, according to one embodiment, the transceiver modules 205 may not be connected to the power wires and instead may be powered by a battery residing on the transceiver module. According to another embodiment, a transceiver module need not be physically connected to the wiring system at all, and in such embodiment, the transceiver module may be powered by a battery on the transceiver module and also may communicate data wirelessly to the control module 202. This allows a flexible design to allow transceiver modules to be connected to any location on the frame of the riding lawn care vehicle 10 and to be removed without having to deal with disconnecting wires.

Each transceiver modules 205 operatively connects (or is associated with) a lawn mower device (e.g., brakes, seat, blades, etc.). For example, as illustrated in FIG. 2, transceiver module 1 is operatively connected with the blades 230, transceiver module 2 is operatively connected with the brakes 231, transceiver module 3 is operatively connected with the seat 232, transceiver module 4 is operatively connected with the reverse switch 233, and transceiver module N is operatively connected with electric blade clutch 252 of the riding lawn care vehicle 10. Various other devices may also be connected to the wiring system 203 via the transceiver modules 205, such as a power-take-off device, parking controls, a trimmings bag and trimmings bag full sensor, any other sensor on the riding lawn care vehicle, or any other device on the riding lawn mower.

It should be understood that each transceiver module 205 may be physically separated from the device that the transceiver module 205 is associated with and is also separate from the control module 202. In this regard, the transceiver module 205 may be located in a box or other housing that is mounted to the chassis of the riding lawn care vehicle 10, whereby such box or housing is not connected to the housing of the control item or device. For example, the transceiver module 205 may be housed in a box mounted to the chassis of the riding lawn mower and have wires connecting such transceiver module 205 with the control module and also wires connect the transceiver module 205 with electronics of the trimmings collector bag. The transceiver module 205 is not physically attached to the trimmings collector bag or physically to the control module 202 other than the wires which electronically connect the transceiver module 205 thereto.

In one embodiment, the transceiver modules 205 are operably connected to each device of the riding lawn care vehicle 10 by interposing a switch in between the power wires to control when the device is to be powered/activated. In another embodiment, the transceiver modules 205 are operably connected to each riding lawn care vehicle device 10 by interposing circuitry (discussed later) in between the data bus and the device so that the transceiver modules 205 can retrieve information from the device and communicate such information to the data module 210 and also receive and process requests from the data module 210 requesting status updates thereof. It is noted that FIG. 2 illustrates that any number of transceiver modules 205 may be included on the wiring system 203.

Each transceiver module 205 is configured to communicate with the control module 202, whether the transceiver module 205 is connected with the data bus or can communicate wirelessly with the control module 202. It should be understood that some transceiver modules 205 may be hardwired to the data bus while other transceiver modules 205 may be configured for wireless communications with the control module 202. For the transceiver modules 205 that are connected to the data bus, such transceiver modules 205 are connected in parallel to the power wires so that the power wires can supply voltage to each transceiver module 205. As mentioned previously, the power wires may supply a 12 volt DC charge to each transceiver module; however, it should be understood that any other power level may be provided to the transceiver modules 205.

The transceiver modules 205 each include a unique identifier that identifies the transceiver module. The transceiver module's identifier may be a predefined alphanumeric number/character (e.g., a serial number) assigned to a particular transceiver module, a predefined location address where the transceiver module is located, or the like. As will be discussed below, the control module 202 uses the transceiver module's identifier to route requests to the desired transceiver module.

Each transceiver module may include a connector 236, which would act as a splitter for the wiring system 204. This allows a user to attach a new transceiver module into the connector so that the new transceiver module will be electrically connected to the wiring system 204. As illustrated in FIG. 2, transceiver module 4 includes a connector 236 and transceiver module 5 is plugged into such connector 236 thereby connecting transceiver module 5 to the wiring system. While transceiver module 4 is the only transceiver module illustrated in FIG. 2 as having a connector 236, any or all transceiver modules may include such connector 236.

One should also realize that the transceiver modules 205 of FIG. 2 may be substantially the same configuration as each other or may have different components. Therefore, while each of the transceiver modules 205 of FIG. 2 is identified by the same reference numeral, it should be understood that the transceiver modules 205 may be different from each other. For example, some transceiver modules 205 may have a connector 236 while others need not have such connector 236.

Figure 3A:
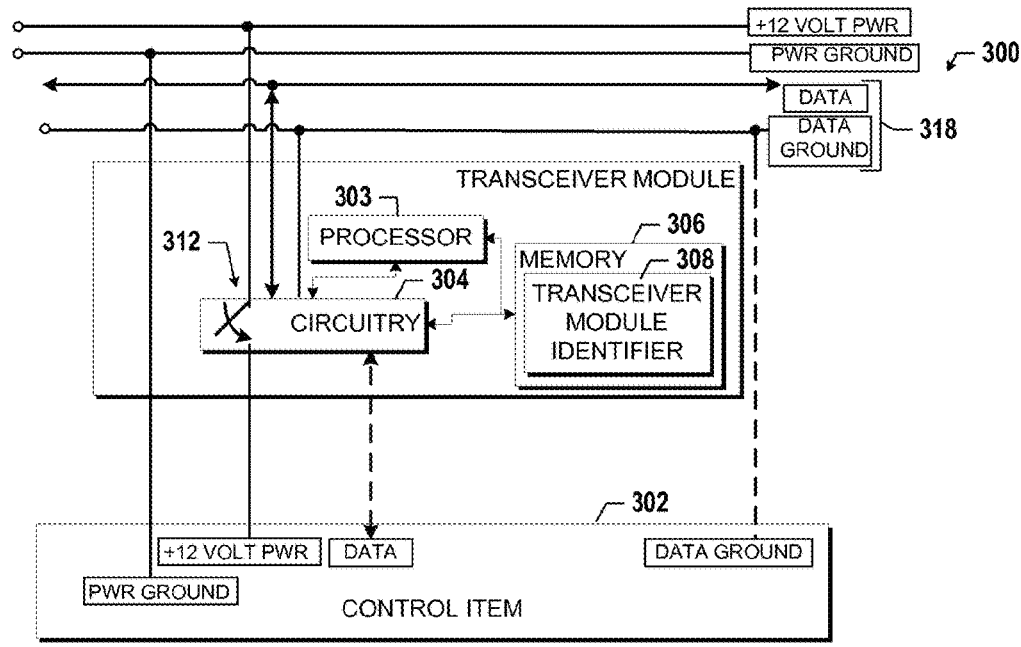
FIG. 3A illustrates a block schematic diagram of a transceiver module that is connected to a control item according to example embodiments.
Figure 3B:
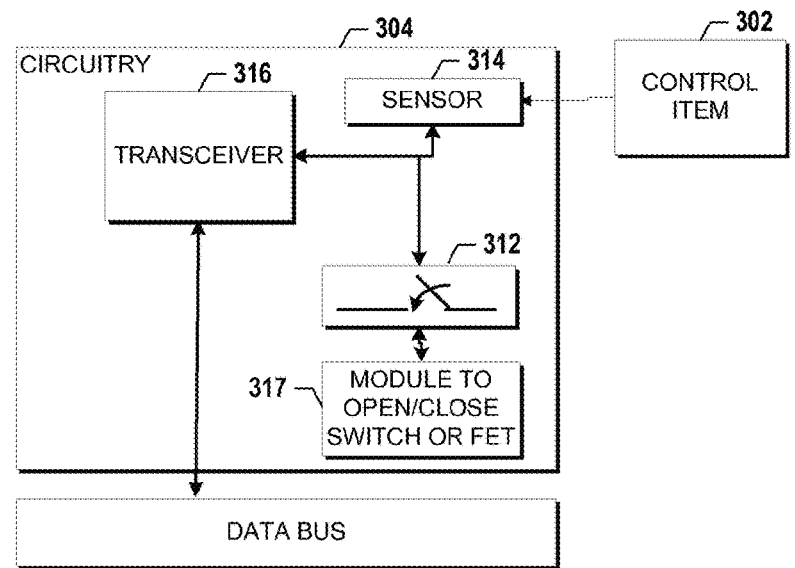
FIG. 3B illustrates a block schematic diagram of circuitry of a transceiver module according to example embodiments.

Prior to continuing with the description of FIG. 2, it is helpful to give a more in depth overview of some of the components of the transceiver modules 205. FIGS. 3A and 3B provide such overview and illustrate an exemplary transceiver module 300 and circuitry 304 of the transceiver module 300, respectively, according to some embodiments. Referring first to FIG. 3A, each transceiver module 300 may also include a processor 303, circuitry 304 and memory 306. The memory 306 includes the transceiver module's unique identifier 308. The circuitry 304 and processor 303 are configured to perform various operations, as described herein, and can communicate data to and from the memory 306 and circuitry 308. For example, the circuitry 304 is configured to receive a request that was sent from the control module 202 and the processor 303 is configured to compare the request's identifier with the transceiver module's identifier 308 to determine if the request was meant for the transceiver module 300. If the request's identifier matches the transceiver module's identifier 308, the processor 303 processes the rest of the request and instructs the circuitry 304 to perform the instructions as specified in the request. The transceiver module's identifier 308 is unique to each transceiver module 300 and processing of the requests and transceiver module's identifier 308 is discussed more later.

As illustrated in embodiment of FIG. 3B, the circuitry 304 may include a transceiver 316 as well as a switch 312 and/or sensor 314. In some embodiments, the processor 303 is included in the circuitry 304. In an embodiment, switch 312 is a FET that controls switching of power to the control item from the power wires. It should be understood that switch 312 could be other type of device which operates as a switch. In some embodiments, the circuitry 304 includes a transceiver 316 and a switch 312 where items on the riding lawn care vehicle are simple on/off, such as the seat switch, brake switch, power-take-off switch, reverse switch, park switch or any other device on the riding lawn mower where operation is an on/off switch. In other embodiments, the circuitry includes a transceiver 316 and a sensor 314 (and optionally a switch 312) where items on the riding lawn care vehicle 10 are not merely on/off switches, such as a ambient air temperature gauge (which is a variable resistor), a smart ignition switch, indicators, and any other item which may be variable. These items would allow the sensors 314 to perform actions, such as report detected conditions/status to the control module 202 via the data bus.

The transceiver 316 is configured to receive requests from the control module 202 and also communicate data (e.g., device status information) back to the control module 202. In one embodiment, the transceiver 316 is connected directly to the data bus 318, from which the transceiver 316 will receive/transmit data to/from the control module 202. In another embodiment, the transceiver 316 is a short-range wireless transceiver (e.g., a Bluetooth transceiver) that is configured to wirelessly connect and communicate with the control module 202 in order to receive/transmit data to/from the control module 202.

The circuitry 304 also controls the switch 312 in the transceiver module 300. Such switch 312 could power and/or activate the control item 302 attached to the transceiver module 300. In this regard, the control module 202 can programmably control opening and closing of the switch 312 (via the module to open/close the switch 317), thereby activating (e.g., powering) a control item 302 connected to the transceiver module 300.

The switch 312 can be any type of switch, such as a Hall-effect switch, a switch with single or double pole and either single or double throw. Hall-effect type switches are switches that do not rely on a contact closure to connect two signal lines. A Hall-effect device senses the change in the nearby magnetic flux density as a magnet approaches. A spatial point is reaches where the flux density exceeds a predetermined threshold, and the Hall-effect device's internal logic causes the Hall-effect device's log output pin to change state. This change in state of logic indicates an activation of a mechanical device that caused the magnet to approach the Hall-effect device. This change in Hall-effect logic state is presented to o the circuitry 304. When the control module 202 interrogates the transceiver module 300 (discussed more below), the control module 202 receives the state of the input pin on the transceiver module 300. A change in state indicates a switch opening or closing.

Thus, the Hall-effect types of switches either act as a contactless switch which may be used in the transceiver modules 300. The fact that no physical contact is required by the Hall-effect type switches enhances the life and reliability of the switch by virtue of the fact that there is no contact erosion or bounce. Additionally, since there are no metal contacts, there is no arcing or electrical noise created in response thereto. Moreover, the Hall-effect switch is all solid state which increases the life of the device, and the Hall-effect switch does not need to trickle a small current through and contacts to keep the contacts clean. Last, the Hall-effect switch is a small design, allowing it to be embedded in existing plastic housing.

The circuitry 304 may also include a sensor 314. The sensor 314 could work with the control item 302 to detect a triggering of a condition or event. For example, the sensor 314 could be connected to the seat 232 such that if an operator sits in the seat 232, the sensor is triggered (such as by triggering a switch at the bottom portion of the seat due to the weight of the operator) and thus indicating that the operator is sitting in the seat. The sensor 314 then would send a signal to the processor 303 and transceiver 316 to transmit the status of the seat 232 to the control module 202. In one embodiment, this sensor 314 could transmit the status signal over the wakeup wire or could only send such signal in response to the control module 202 requesting the seat status. Regardless, the sensor 314 may be included in the circuitry 304 to allow the status of the associated control item 302 to be sent back to the control module 202.

Additionally, as discussed below, the status of components in the transceiver module 205, such as how many times the switch has been opened and closed, could be sent back to the control module 202. Other information can also be attached to the status such as the transceiver's identifier, an identifier of the control item (e.g., the seat), and/or other information, as is discussed in more depth later.

Referring back to FIG. 2, the control module 202 performs various functions to control electrical and device operations of the riding lawn mower 10. The control module 202 controls the voltage and current to be applied to various components attached to the control module 202. For example, the control module 202 controls the voltage outputted from the battery 206 that is applied to the transceiver modules 205. This voltage is illustrated in the Figures and described herein as a 12 volt DC voltage, but it should be understood that the present disclosure should not be limited to such specific voltage and could be any voltage amount, whether analog or digital, or AC or DC.

Additionally, the control module 202 manages data communication in the electrical system. The control module 202 may be electronically programmed to perform various operations. In one embodiment, the control module 202 can send requests for information to the transceiver modules 205. When sending requests to a transceiver module, the control module 202 identifies the particular transceiver module's identifier assigned to such transceiver module, such as a predefined alphanumeric number/character (e.g., a serial number) assigned to or associated with a particular transceiver module, a predefined location address where the transceiver module is located, or the like. After the transceiver module's identifier is identified, the control module 202 sends a message along with a header, whereas the header includes the transceiver module's identifier. Such transceiver module's identifier will identify which transceiver module the message is intended. When the request is received by the transceiver module, the transceiver module will compare the transceiver module's identifier with the identifier in the received request. If the identifier in the request matches the transceiver module's identifier associated with the transceiver, the transceiver module will process the request (as discussed below); otherwise, the request will not be processed.

For example, if the control module would like to know the status of the brakes 231, the data module 210 of the control module 202 sends a request message along the data bus 318 to the brakes 231. The request is received by transceiver module 2, which is attached to the brakes 231. The request includes the transceiver module's identifier and an instruction to send back the status of the brakes 231 to the data module 210, according to some embodiments. Transceiver module 2 compares the request's identifier (from the control module 202) with the transceiver module identifier 308, such as XXXX1234. If these identifiers match, this means that the request was meant for that particular transceiver module and the transceiver 316 of transceiver module 2 communicates the instructions in the request to the processor 303 of transceiver module 2. The processor 303 then retrieves the status of the brakes 231 (e.g., on/off, power level, operating level, other level as measured by resistance, etc.) and/or of the transceiver module 2, and then the transceiver 316 transmits such status to the data module 210. The status sent back to the data module includes the transceiver module's identifier, in one embodiment, so that the data module understands that the status is being returned from transceiver module 2. The status is then provided to any other portion of the control module for any predefined actions that are triggered by the returned status information.

It should be noted that the instructions in the request may be instructions other than a status inquiries. The request could be instructions for the control item 302 to perform operations. For example, if it is determined that the cutting blades 209 should be activated, the control module 202 sends a request to a transceiver module 211 associated with the cutting blades 209 for the blades 209 to be activated. In response to verifying the request is meant for the transceiver module, the transceiver module will execute the request instructions and provide power to the cutting blades 209. Thereafter, the transceiver module 211 may send a status update via the data bus to the control module 202 indicating the cutting blades 209 have been activated or powered and the request has been fulfilled.

The control module 202 may send multiple requests to the transceiver modules 205 to perform various operations. In one embodiment, communications to and from the transceiver modules 205 occur in a timed fashion on the data bus so that multiple requests can be sent to and processed by the transceiver modules 205 along the same data bus. For example, multiple requests may be sent by the transceiver module asynchronously and when each transceiver module receives its respective request, the transceiver modules 205 send a status back along the data bus asynchronously. This allows for only one transmission at a time of a data packet to the transceiver module so that such data packet is not confused with data in another data packet meant for another transceiver module.

Additionally, the control module 202 can determine whether a switch is no longer working as opposed to just being open-circuited. Because a malfunctioning switch may look like an open circuit, the only way to actually determine whether the switch is not working properly may be to request the status of the switch. When a request is sent to a transceiver module 205 (from the data module 210), the transceiver module 205 will return status information about the associated device as well as other components, such as the switch. The switch data that may be returned could include the switch count as well as the switch status, such as "open," "closed," or "not working properly." It should be noted that this request may be sent periodically to ensure all switches are working properly.

As illustrated in the exemplary embodiment of FIG. 2, the control module 202 has a power protection/filtering portion 208 and a data module 210. In applying the power to the desired components, the power protection/filtering portion 208 of the control module 202 may increase or decrease the amount of power received from the batteries. The output of the power protection/filtering portion 208 is shown as reference numerals 212 and 214. In the example of FIG. 2, these outputs are shown as a 12 volt (DC) 212 and a power ground 214 (collectively "power output"). As previously discussed, this power output will be applied to the components (e.g., transceiver modules) placed in parallel thereto.

The data module 210 is connected with the data bus (i.e., data 216 and data ground 218) and wakeup wire 220. The data module 210 is configured to determine and transmit request messages and data packets to the transceiver modules 205, as stated above. The data module 210 receives status information from the transceiver modules 205 and other devices on the riding lawn mower, such as the engine rpm 259. The data module 210 communicates the data received from the transceiver modules 205 and performs predefined actions in response to the status data or other data contained in the signals sent back from the transceiver modules 205. Examples of such predefined actions are discussed later.

The data module 210 also includes a wakeup module 220, which can receive wakeup data from certain transceiver modules configured to send a wakeup signal upon certain signals. The wakeup signal could be a 12 volt DC pulse or a 12 volt signal from the transceiver module. This pulse or signal would indicate that the control item is "awake" (or operating), or can be any other alert that may be sent to the data module 210.

In one embodiment, the data module 210 also can manage information about each transceiver module 205. For example, as previously mentioned, for each switch 312 in the transceiver module 205, the data module 210 can retrieve information about how many times the switch has been opened and closed ("switch count"). This switch count information may be useful to an operator who is performing diagnostic tests on the system because such operator will know whether the switch is about to go bad or not.

The data module 210 may use status information received from the transceiver modules to control field-effect transistor ("FET") switches 258 in performing predefined functions, such as controlling items of the riding lawn care vehicle 10, including the headlines 253, fuel shutoff solenoid 254, the electric blade clutch 252, the direct starter control/solenoid 251, or any other component. The processor of the data module 210 controls the FET switches 258 and checks conditions of the transceiver modules 205 or switches on the data bus and if conditions match triggering conditions, the processor will command the appropriate FET switch 258 on, as previously mentioned. For example, (1) if the data module receives information about the current engine rpm (e.g., if the RPM>1000), (2) if the status information from the headlight switch indicates the headlight switch is "on", and (3) if the battery voltage is greater than a threshold amount of voltage, the FET switch 258' associated with the headlights 253 is then turned on, thereby activating the headlights 253.

After turning a FET switch 258 "ON," the FET switch 258 then sends back to the data module processor what the FET switch's current status is. The FET switches 258 also have a hard line back into a digital input to the data module processor for the data module processor to monitor that the FET switch 258 output is "ON" or "OFF". If the data module processor commands a FET switch 258 to be "ON", but the processor does not detect current back from such FET switch 258, the processor checks the FET switch's output voltage. If the FET switch's output voltage is a proper "ON" voltage (e.g., 12 volts) like it should be, then the processor determines that there is an open circuit located beyond the FET switch 258; however, if the FET switch's output voltage is not a proper "ON" voltage (e.g., not 12 volts), the FET switch 258 is commanded to be "ON" and the current is either high (or none present), then it is likely that there is a short circuit condition. These conditions benefit an operator in knowing what the status is of the circuit and likely faults associated therewith.

While FIG. 2 illustrates that the FET switches 258 may be 12 volt switches, it should be understood that these switches could be any other voltage and need not be limited to 12 volts. Additionally, these switches are not required to be a FET and could be any other type of switch, such as a standard switch or other logic controlled in response to a predetermined triggering. Additionally, FIG. 2 illustrates four FET switches 258, but it should be understood that any number of FET switches 258 may be employed.

In one embodiment, these FET switches 258 are included as part of the control module 202 as illustrated in FIG. 2. It should be understood, however, that any of these FET switches 258 may be removed from the control module 202 and thus may be converted into a transceiver module 205 which may or may not be included on the wiring system depending on the lawn mower model. For example, if some lawn mower models have an electric blade clutch 252, but other lawn mower models do not, such the FET switch 258 associated with the electric blade clutch 252 could be removed from the control module 202 (as illustrated by the dashed lines) and could be included in a transceiver module (shown as transceiver module N in FIG. 2) that is connected with the wiring system only on the models as desired. This allows a flexible design to save costs on those models where such FET switch in the control module 208 is not needed in some lawn mower models, but still include such FET switch on the other models (via the transceiver module) without having to redesign those systems.

The wireless communication module 221 of the control module 202 allows the control module 202 to wirelessly communicate with transceiver modules 202, as previously discussed. Additionally, the wireless communication module 221 of the control module 202 may include a short-range wireless transceiver (e.g., Bluetooth) which can pair with external wireless devices, such as mobile smartphones, laptops, and the like. This allows these devices to communicate data between the control module 202 and these wireless external devices. More about such interfacing is discussed in more depth later with regard to FIGS. 5A, 5B and 5C.

The control module 202 may also include a shutdown module 260. The shutdown circuit 260 controls the primary side of the engine coil (or other engine shutdown input) 250 to manages the ability of the engine to run or be shutdown in the event the engine should not be running. The shutdown circuit 260 is initially closed-circuited (using a close-to-ground relay) in that the primary side of the engine coil is grounded, thereby not allowing the engine to run. If the shutdown circuit 260 receives input from the engine RPM input 259 indicating that the engine started to crank spontaneously (e.g., if the battery was directly jumpered to the started, etc.), the shutdown circuit 260 will maintain the closed-circuited condition so that the engine is not allowed to crank. This allows for a failsafe condition. However, if a user desires to crank the engine and the shutdown circuit 260 detects the engine RPM input 259 is substantially zero, the shutdown circuit 260 opens the grounding-circuit so that the primary side of the engine coil is no longer grounded, allowing the engine to be cranked.

It should be noted that a FET switch 258" may also act to cut the engine off. The FET switch 258" can receive instruction from the data module 210 to instruct a fuel shutoff solenoid 254 to cut off fuel to the engine, thereby killing the engine. This can occur if the operator turns the engine switch off.

Additionally, the control module 202 may control other FET switches 258. For example, as illustrated in FIG. 2, a FET switch may control the blade clutch 252. The FET switch 258 is activated by the control module 202 in response to certain triggering conditions. For example, while the riding lawn mower is being operated, the control module 202 may receive information from transceiver module 3 indicating that the operator is no longer in the seat (possibly indicating that the operator has fallen while operating the mower). In this regard, the control module 202 checks that the mower is currently in operation (i.e., the blades are rotating) and if the seat sensor indicates the operator is no longer in the seat (per data the control module 202 receives from transceiver module 3), the control module 202 activates the FET switch associated with the electric blade clutch 252 which stops rotation of the blades in the cutting deck. This is a safety feature which ensures that the operator is not accidentally harmed.

Figure 4:
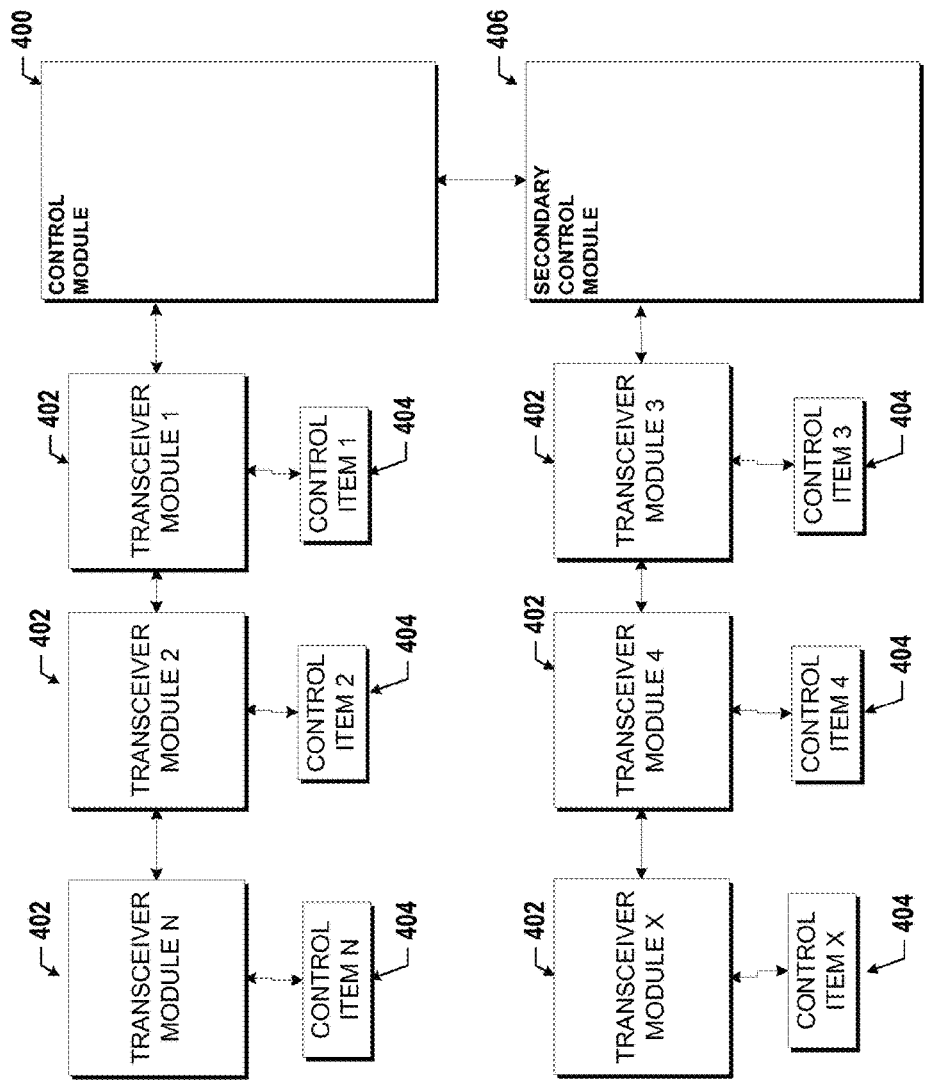
FIG. 4 illustrates an electrical system of a riding lawn care vehicle according to another example embodiment.

FIG. 4 illustrates an electrical system of a riding lawn care vehicle according to another example embodiment. The electrical system includes a control module 400, transceiver modules 402, control items 404, and a secondary control module 406. The control module 400, transceiver modules 402, and control items 404 of FIG. 4 may be the same as the control module 202 the transceiver modules and control items of FIG. 2, respectively. The secondary control module 406 is also connected with transceiver modules 402 and control items 404 and may have functions similar to that of the primary control module 400. The secondary control module 406 allows for flexibility in the electrical system design in that the secondary control module 406 can be another control module that is separate from the primary control module 400 but may be programmed to perform certain functions. This may be advantageous in the event that basic functions that will always be included in the design are part of the primary control module 400 and optional control module features may be included on a secondary control module 406, especially though features which work with optional control items that may not be included on all riding lawn mower models.

As illustrated in FIG. 4, the secondary control module 406 communicates various data with the primary control module 400, such as status information of the various transceiver modules 402. The secondary control module 406 and it's associated transceiver modules 402 and control items 404 may also be powered through the control module 400.

It should be understood that the secondary control module 406 is an optional feature and the electrical system may only include the primary control module 400 or may include multiple control modules.

Figure 5A:
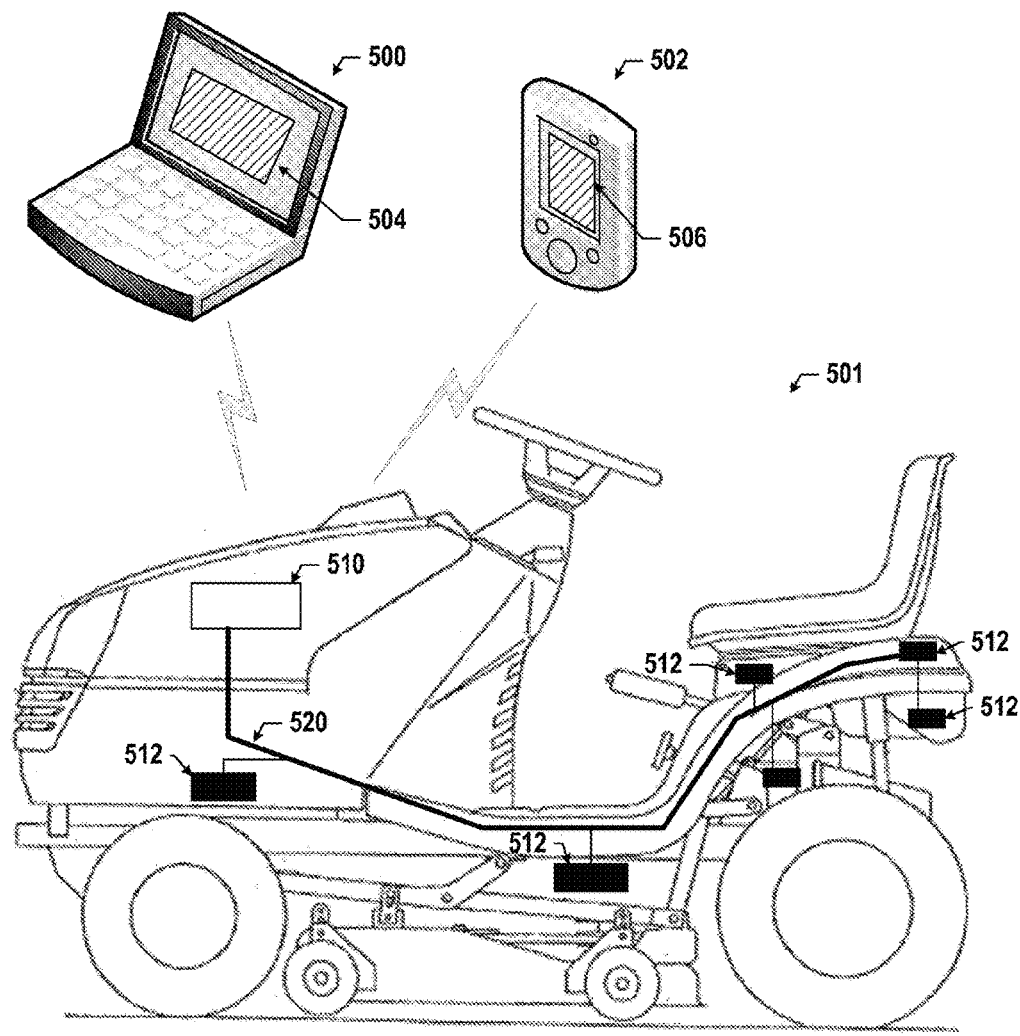
FIG. 5A illustrates an electrical system of a riding lawn care vehicle with short-range wireless capability according to an example embodiment.

FIG. 5A illustrates an electrical system of a riding lawn care vehicle 501 with short-range wireless capability according to an example embodiment; The riding lawn care vehicle 501 may be similar to the riding lawn care vehicle 10 previously described in FIG. 1. The electrical system of the riding lawn care vehicle 501 includes the control module 510 and transceiver modules 512, which are the same as the control module 202 and transceiver modules 205 of FIG. 2, respectively. As illustrated, the control module 510 may be located under the hood (or at any other location) and the transceiver modules 512 located at other locations on the riding lawn care vehicle 501. The transceiver modules 512 are connected to the control module 510 through the use of a wiring system 520. Each of the transceiver modules 512 is associated with and located proximate to its associated control device, such as the brakes, seat, trimmings collector bag, cutting deck, etc.

The control module 510 includes a wireless transceiver which communicates wirelessly with a mobile device, such as a computer 500 or a mobile phone 502. As previously discussed, the wireless connection may be a short-range wireless connection, such as Bluetooth. The mobile devices include an interface to transmit and receive data between the mobile device and the control module 510. For example, a graphical user interface ("GUI") 504 is included on the computer 500 and a mobile GUI 506 is included on the mobile phone 502, both of which are discussed in more depth below with regard to FIGS. 5B and 5C.

Figure 5B:
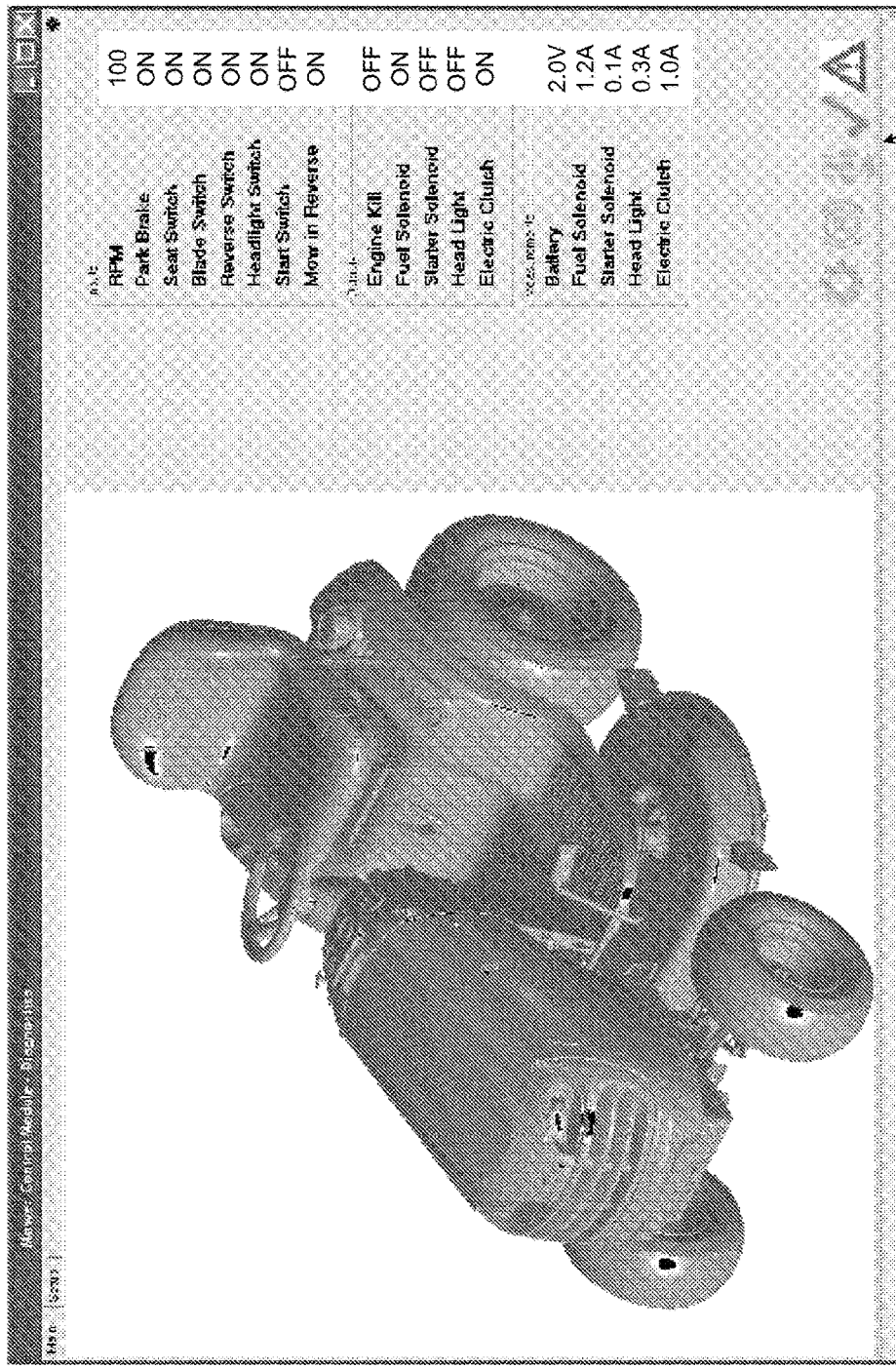
FIG. 5B illustrates a graphical user interface of a computer connected with an electrical system for a riding lawn care vehicle according to an example embodiment.

FIG. 5B illustrates the graphical user interface 504 of a computer connected with an electrical system for a riding lawn care vehicle according to an example embodiment. As illustrated, the GUI 504 shows various information about various control items of the riding lawn care vehicle. In some embodiments, the GUI 504, provides status information of various switches on the electrical system, the electrical current/voltage of different electrical components of the electrical system, and other component information. For example, the GUI 504 illustrates that the parking brake is "ON," the seat switch is "ON," but the head light switch is "OFF." Additionally, the battery voltage is 2.0 Volts while the fuel solenoid is 1.2 Amps. These values were measured by the control module to the various switches and transceiver modules and then compiled and transmitted wirelessly to the computer. The computer then displays this information for the user. The status information and variable data may trigger alerts 530 which displays to the user to indicate a warning, caution or that all systems are working properly. In one embodiment, the computer determines whether or not an alert should be presented to on the GUI 504 or whether the alert is determined by the control module and then sent to the computer 500 as an alert data string for display by the GUI 504.

Figure 5C:
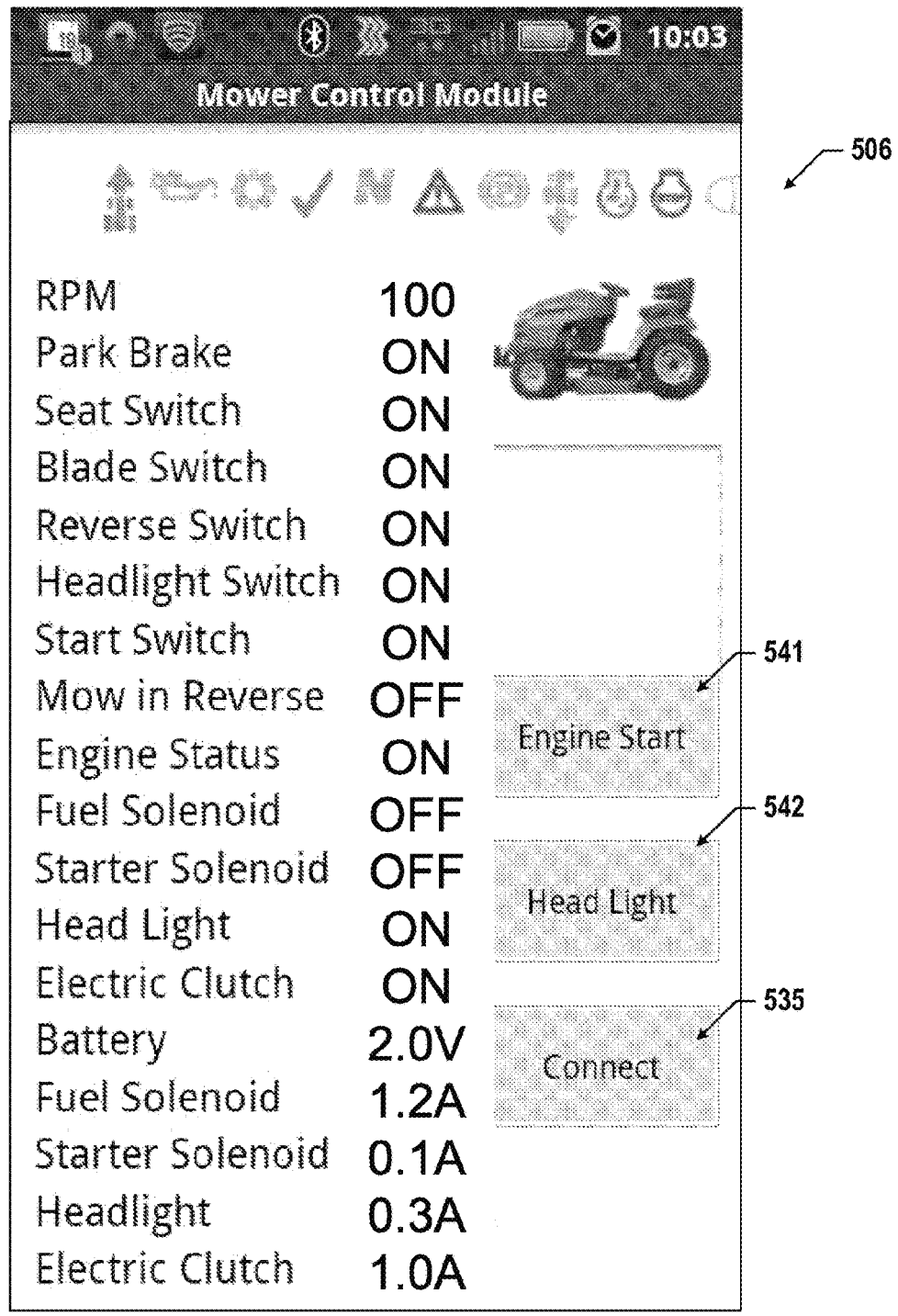
FIG. 5C illustrates a graphical user interface of a mobile phone connected with an electrical system for a riding lawn care vehicle according to an example embodiment.

FIG. 5C illustrates the mobile graphical user interface 506 of a mobile phone connected with an electrical system for a riding lawn care vehicle according to an example embodiment. The mobile GUI 506 also displays component status information and alert data, similar to the computer's GUI 504. The mobile GUI 506 has a connect button 535 to allow the user to connect and update the component status information. In response to activating such button 535, the mobile GUI 506 sends a request message to the control module of the electrical system on the riding lawn care vehicle to ping the transceiver modules to access such information. Once the data is retrieved or as the data is obtained, the control module wirelessly transmits such data to the mobile phone for display on the GUI 506 to the user. In this regard, the user can request any data from the control module as a press of a button on the mobile GUI 506.

In addition to displaying such information, the mobile GUI may also provide other buttons that can allow the user to activate certain functions of the riding lawn care vehicle. For example, the user can start the engine by depressing the "Engine Start" button 541 on the GUI 506. The mobile GUI 506 then sends a start message to the control panel to power the starter control or solenoid. In this regard, the user can crank the riding lawncare vehicle's engine through the mobile phone. Additionally, the head light button 542 may be depressed or otherwise activated by the user and in response thereto, the mobile phone sends an instruction message to the control module of the riding lawn care vehicle to activate the FET that controls the head light, thereby allowing power to be provided to the head light. Any other portion of the riding lawn care vehicle could also be controlled via the mobile GUI.

It should be noted that either GUI 504, 506 may be a device to only display data and thus, the user does not interact with the GUI 504, 506 according to some embodiment. However, either GUI 504, 506 may allow the user to interact with the electrical system of the riding lawn care vehicle as exemplified by FIG. 5C.

These GUIs 504, 506 provide a tool for the user to determine the status information of any switch, component or variable of the riding lawn care vehicle for the user to monitor operations of the riding lawn care vehicle. In one embodiment, date of these GUIs 504, 506 may be forwarded to a wide area network, such as the Internet or other network. This allows a servicing entity, such as the lawn care vehicle's manufacturer or servicer, to diagnose the lawn care vehicle should the riding lawn care vehicle have a problem. The servicing entity could then determine what the problem is by looking at status information of the components of the riding lawn care vehicle and could have the user fix the problem without a repair representative having to physically look at the riding lawn care vehicle. Additionally, the serving entity could perform routing servicing even if the riding lawn care vehicle does not have an issue and identify potential future issues to be proactive in keeping the riding lawn care vehicle operational, For example, the number of times each switch has been opened and closed may be transmitted to the servicing entity and if one of the switches has reached a certain amount of openings/closings, the servicing entity may know that that switch will need to be replaced soon and tell the user to go ahead and buy a replacement prior to the switch actually going bad. This could add convenience and service to the customer experience of the riding lawn care vehicle.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:
1. A riding lawn care vehicle comprising:
a frame;
an operator station operably coupled to the frame and configured to support an operator during operation of the riding lawn care vehicle;
wheels operably coupled to the frame;
a steering assembly operably coupled to the wheels and configured to receive steering inputs provided by the operator;
a control module configured to control electrical operations of the riding lawn care vehicle;
a first transceiver module operably coupled between the control module and a first device of the riding lawn care vehicle;

a second transceiver module operably coupled between the control module and a second device of the riding lawn care vehicle; and a data wire operably coupling the first and second transceiver modules and the control module to enable two way communication between the control module and each of the first and second devices of the riding lawn care vehicle, the first and second transceiver modules each being operably coupled to the data wire in parallel, wherein the data wire is configured to carry a first signal to activate the first device of the riding lawn care vehicle and a second signal to indicate a status of the second device of the riding lawn care vehicle.

2. The riding lawn care vehicle of claim 1, further comprising a wiring harness, wherein the wiring harness comprises the data wire and a power wire, and wherein power for the first and second devices of the riding lawn care vehicle is provided via the power wire.

3. The riding lawn care vehicle of claim 2, wherein the wiring harness further comprises a wakeup wire via which a third signal is provided to the first and second devices of the riding lawn care vehicle to wakeup the first and second devices of the riding lawn care vehicle, respectively.

4. The riding lawn care vehicle of claim 1, wherein the data wire is a portion of a data bus, and wherein the data bus further comprises a data ground wire.

5. The riding lawn care vehicle of claim 1, wherein a third signal is provided to the first and second devices of the riding lawn care vehicle to wakeup the first and second devices of the riding lawn care vehicle, respectively, via the data wire.

6. The riding lawn care vehicle of claim 1, wherein the two way communication associated with the first and second signals is sequentially conducted in a timed fashion via the data wire.

7. The riding lawn care vehicle of claim 1, wherein the first device comprises a brake, blade, power-take-off, or clutch of the riding lawn care vehicle, and wherein the second device comprises a bagging attachment, seat, brake, blade, or battery of the riding lawn care vehicle.

8. The riding lawn care vehicle of claim 1, wherein the first transceiver module and the second transceiver module each comprises a switch and a transceiver, each transceiver configured to receive a request from the control module and to communicate data regarding status of the switch back to the control module via the data wire.

9. The riding lawn care vehicle of claim 8, wherein a number of cycles of the switch is communicated to the control module via the data wire.

10. The riding lawn care vehicle of claim 9, wherein the switch comprises one or more field effect transistors.

11. The riding lawn care vehicle of claim 1,
wherein the first transceiver module is associated with a first unique identifier, and the second transceiver module is associated with a second unique identifier,
wherein a respective one of the first and second unique identifiers is included in a header of a message transmitted on the data wire to indicate a corresponding addressee or originator of the message.

12. The riding lawn care vehicle of claim 1, wherein the first and second transceiver modules are removable without further modification to the data wire.

13. The riding lawn care vehicle of claim 1, wherein the data wire is configured to receive a third transceiver module without further modification to the data wire.

14. The riding lawn care vehicle of claim 1, wherein the control module is configured to communicate wirelessly with a mobile communication device.

15. The riding lawn care vehicle of claim 14, wherein the mobile communication device comprises a display configured to display the status of the second device of the riding lawn care vehicle and at least one or more other devices of the riding lawn care vehicle.

16. The riding lawn care vehicle of claim 14, wherein the mobile communication device comprises a display configured to display a button for selection by a user to activate the first device of the riding lawn care vehicle.

17. The riding lawn care vehicle of claim 14, wherein the mobile communication device comprises a display configured to display data requested by the user associated with a selected one of the first device or the second device of the riding lawn care vehicle.

18. An electrical system for a riding lawn care vehicle, the electrical system comprising:
a control module configured to control electrical operations of the riding lawn care vehicle;
a first transceiver module operably coupled between the control module and a first device of the riding lawn care vehicle;
a second transceiver module operably coupled between the control module and a second device of the riding lawn care vehicle; and
a wiring harness operably coupling the first and second transceiver modules and the control module to enable two way communication between the control module and each of the first and second devices of the riding lawn care vehicle, the first and second transceiver modules each being operably coupled to the wiring harness in parallel,
wherein the wiring harness is configured to carry a first signal to activate the first device of the riding lawn care vehicle and a second signal to indicate a status of the second device of the riding lawn care vehicle.

19. The electrical system of claim 18, wherein the wiring harness comprises a power wire, a ground wire, and a data wire, wherein power for the first and second devices of the riding lawn care vehicle is provided via the power wire, and wherein the first and second signals are provided via the data wire.

20. The electrical system of claim 18, wherein the first and second signals are each provided via a same wire of the wiring harness.

* * * * *